No. 867,752. PATENTED OCT. 8, 1907.
J. H. PHILLIPS, Jr.
PIPE OR HOSE COUPLING.
APPLICATION FILED JAN. 7, 1907.

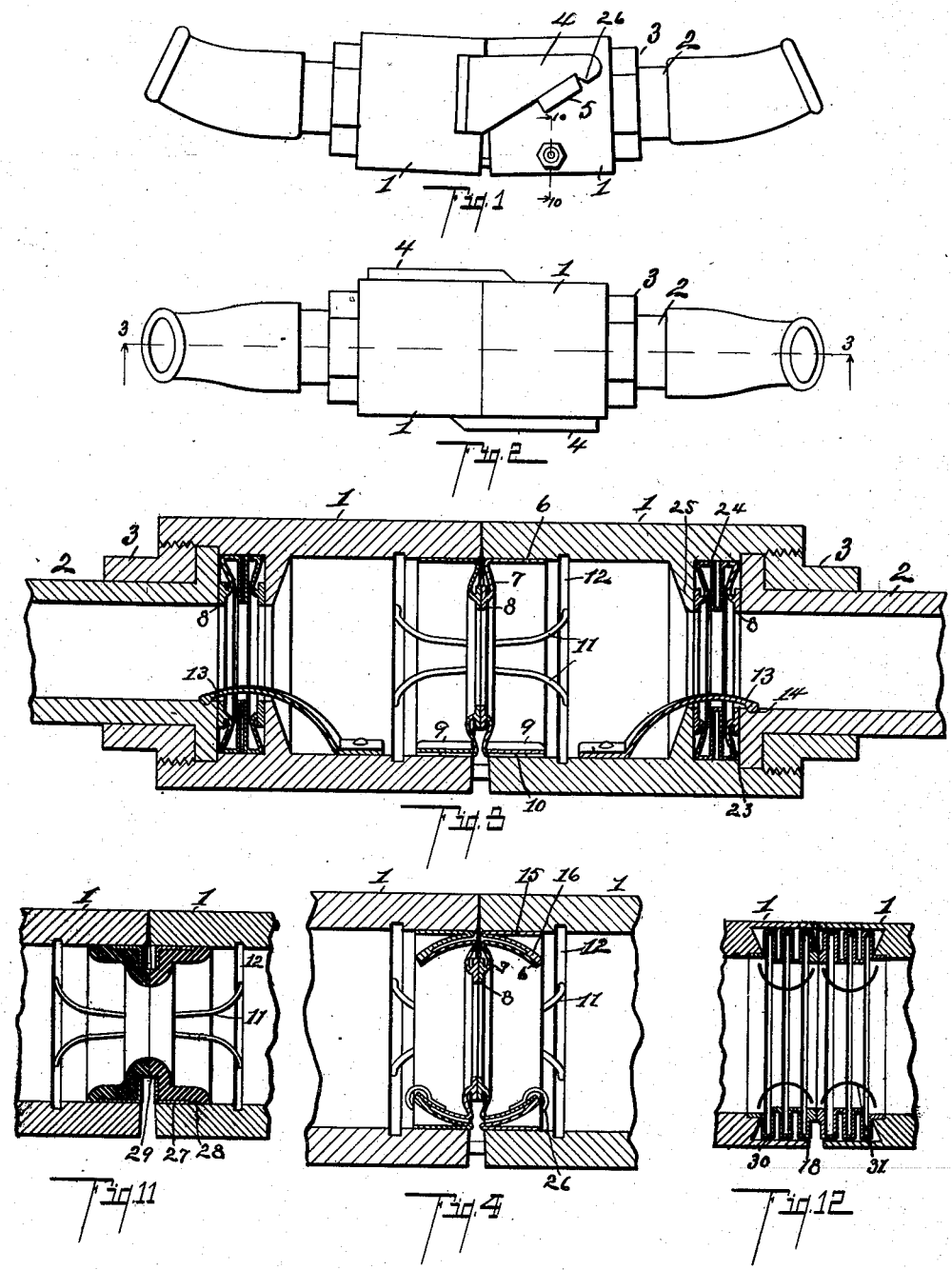

2 SHEETS—SHEET 2.

Witnesses:
Lulu Grunfeld
Gertrude Tallman

Inventor,
John Henry Phillips Jr.
By Chappell & Earl
Att'ys

UNITED STATES PATENT OFFICE.

JOHN HENRY PHILLIPS, JR., OF JACKSON, MICHIGAN.

PIPE OR HOSE COUPLING.

No. 867,752.   Specification of Letters Patent.   Patented Oct. 8, 1907.

Application filed January 7, 1907. Serial No. 351,196.

*To all whom it may concern:*

Be it known that I, JOHN HENRY PHILLIPS, Jr., a citizen of the United States, residing at the city and county of Jackson, State of Michigan, have invented certain new and useful Improvements in Pipe or Hose Couplings, of which the following is a specification.

This invention relates to improvements in pipe or hose couplings.

My improved pipe or hose coupling is particularly adapted and, as shown in the accompanying drawing, is designed for use as a coupling for the steam and air pipes of railway trains, although it may be readily adapted, and is very desirable for use in various other relations.

The objects of this invention are, first, to provide an improved pipe or hose coupling which may be readily coupled or uncoupled, and one which forms a very perfect and secure joint. Second, to provide an improved coupling for pipes or hose in which the pressure of the elastic fluid within the pipes assists in retaining the coupling members together and in forming a perfect joint. Third, to provide in a structure of the class described an improved swivel joint and packing ring therefor. Fourth, to provide in a structure of the class described an improved packing ring.

Further objects, and objects relating to structural details, will definitely appear from the detailed description to follow.

I accomplish the objects of my invention by the devices and means described in the following specification.

The invention is clearly defined and pointed out in the claims.

Figure 5:
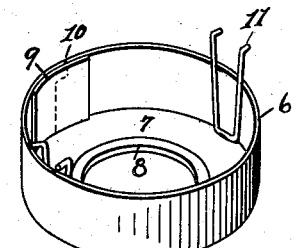
Figure 6:
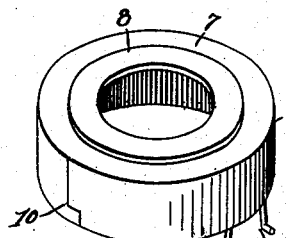
Figure 7:
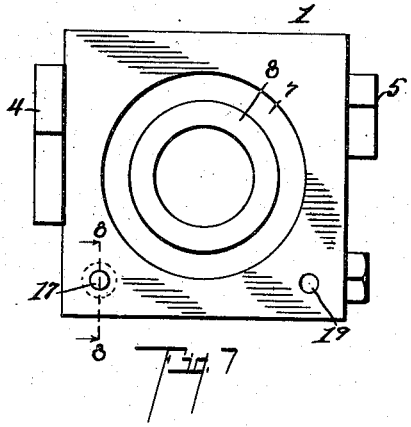
Figure 8:
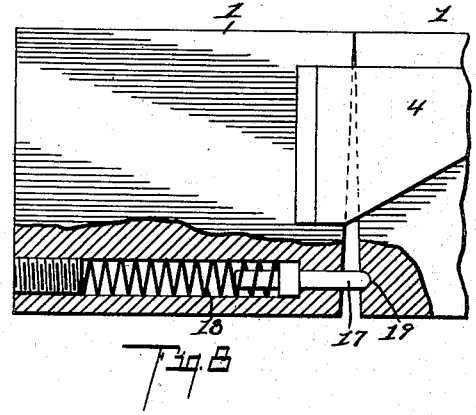
Figure 9:
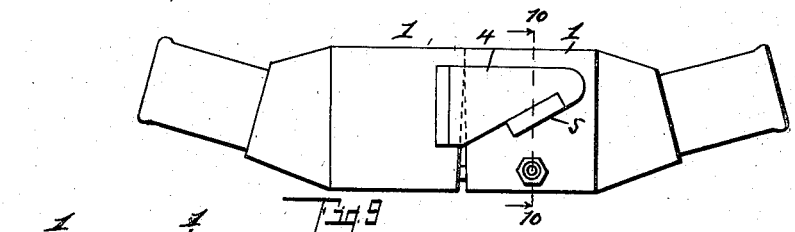
Figure 13:
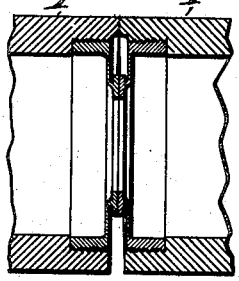
Figure 10:
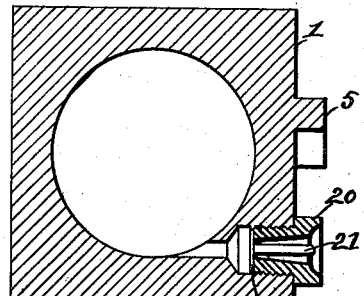

A structure embodying the features of my invention is clearly illustrated in the accompanying drawing, forming a part of this specification, in which, Figure 1 is a side elevation of a structure embodying the features of my invention. Fig. 2 is a plan thereof. Fig. 3 is an enlarged longitudinal detail section, taken on a line corresponding to line 3—3 of Fig. 2. Fig. 4 is a longitudinal detail section of a modified construction, the coupling members proper being adjustably arranged in spherical sockets provided therefor. Fig. 5 is an inverted, or inside, perspective of one of the coupling members 6. Fig. 6 is an outside perspective of one of the coupling members 6. Fig. 7 is an end elevation of one of the coupling heads. Fig. 8 is a detail longitudinal section, taken on a line corresponding to line 8—8 of Fig. 7. Fig. 9 is a side elevation of a slightly modified construction, the swivel feature of the coupling heads being omitted. Fig. 10 is an enlarged cross section, taken on a line corresponding to line 10—10 of Figs. 1 and 9, showing the drain for the coupling heads. Fig. 11 is a detail longitudinal section of a modified construction, the coupling members being formed in part of rubber, or like flexible material. Fig. 12 is a detail longitudinal section of a modified construction of the coupling members which are formed with a plurality of united U-shaped rings. Fig. 13 is a further modification, the coupling members being threaded into the heads.

In the drawing, the sectional views are taken looking in the direction of the little arrows at the end of the section lines and similar reference characters refer to similar parts throughout the several views.

Referring to the drawing, the coupling heads 1 are preferably provided with swivel nipples for the attachment of the hose or pipe. This I preferably accomplish by providing the swivels 2 with outturned annular flanges at their inner ends, which are seated against suitable shoulders 23 provided therefor in the coupling heads. The swivels 2 are retained in the heads by collars 3, which are threaded into the coupling heads, as clearly appears in Fig. 3 of the drawing. The coupling heads are provided with cylindrical bores to receive the packing rings 6. These packing rings 6 are preferably formed of spring metal and are provided with inwardly projecting annular flanges 7 with ring-like bearing lips 8 at the edges thereof. The flanges 7 are preferably somewhat C-shaped, or curved in cross section to add to their spring quality. This is also of advantage in that the springing of the packing rings, when thus formed, does not open or rock the coupling lips upon each other. The body portions of the packing rings are preferably split, or divided at one side, as at 10, so that they will readily expand under pressure of the elastic fluid within the pipes to prevent leakage under the same. To close this opening, a joint lap piece 9 is secured at one side of the opening 10 and arranged to lie across the same. This joint lap piece is also of spring metal so that, under pressure of the steam or other fluid, it is forced down to seal the joint opening.

The packing rings are preferably retained within the heads by spring fingers 11, which are adapted to engage the annular grooves 12 within the coupling heads. By this manner of securing, the packing rings may be inserted or removed, as desired. The spring fingers 11 also tend to hold the coupling members normally forward within the coupling heads, allowing a slight adjustment thereof.

A packing ring 24 is provided for the swivel joint. This embodies the same principle as the packing rings described, being a spring metal ring fitted into the coupling head and being preferably made up of a plurality of united U-shaped spring metal rings, the outer arms thereof having bearing ring-like lips 8 corresponding to the lips 8 of the packing rings. One of these bearing lips is arranged to bear against the end of the swivel 2, and the other against an inwardly projecting flange 25 provided therefor in the coupling head; see Fig. 3. The spring of the ring holds the bearing lips normally against their seats, and, when the packing ring is under the pressure of the elastic fluid within the pipe, the bearing lips are held firmly against their seats. As soon as the pressure within the pipes is released, the swivel can be turned quite easily, as the friction of the packing ring is comparatively slight. At the same time, it is sufficient to insure a perfect joint, and, as stated, when the pressure is applied, it holds the lips firmly against their seats provided therefor. This is also true of the coupling members described.

When the coupling is adapted to be used as a coupling for the pipes of trains, the nipple portion of the swivel is turned upwardly so that the coupling is held in an upright position when suspended by the coupling hose. The swivel is normally retained in this position by a spring 13 secured on the inside of the head, the end of which is adapted to engage a suitable hole 14 provided therefor in the swivel; see Fig. 3. This, while it holds the heads normally in a fixed position relative to the swivel, permits the rotation thereof, when desired.

The coupling heads are provided with forwardly projecting rigid latches 4 on one side and with catches or stops 5 therefor on the other, so that, when the coupling heads are brought end to end, the latch of one engages the stop of the other; see Figs. 1 and 2. These stops are preferably inclined, the hook of the latch engaging over the inner end thereof and the latch resting thereon. The hook of the latch is preferably cut away at 26, so that it readily slips over the stop and tends to draw the heads together. To hold the latches in engagement, I provide spring pressed pins 17 slidably arranged in suitable chambers provided therefor in the coupling heads, the pin of one head being adapted to engage a suitable seat 19 provided therefor in the other head. The pins are held normally outward by coiled springs 18 arranged within the chamber. By this arrangement, the springs are protected so that there is no danger of their becoming inoperative by becoming clogged with snow, ice, or the like.

To secure the coupling, it is only necessary to bring the members end to end, when the latches will readily engage. The spring pins 17, being arranged at the bottom of the heads, tend to hold the hooks in engagement. The upturned nipples of the swivels also tend to this same result, as does also the pressure of the elastic fluid within the pipes. To disengage the coupling heads, it is only necessary to rock the same downwardly, which releases or disengages the latches. The lips, or engaging portions of the coupling members project slightly from the coupling heads, so that, when the heads are brought together, the lips contact and are put under pressure. Owing to the spring quality of the packing rings, they readily yield to permit the manipulation of the coupling heads, and, at the same time, maintain a perfect joint. The spring of the packing rings is sufficient to hold them in contact under ordinary conditions. However, as soon as the steam, or other fluid, is turned on, the pressure thereof on the flange portions and lips of the coupling members holds the parts together.

The coupling heads are preferably provided with drains: see Fig. 10. These consist of suitable passages having plugs 20 threaded into the outer ends thereof. The inner ends of these plugs form the seat for the disk valves 22, the stems of the valves being arranged through the plugs to be engaged by the operator, when it is desired to open the valves. The bore of the plug 20 is conical so that when the pressure of the steam is off the weight of the stem rocks the valve on its seat. The valves are preferably flexible to insure a more perfect fit when under pressure. These valves, owing to their shape are held against the seat by the pressure of the fluid within the heads. When the pressure is off, the valves automatically open so that the coupling is automatically drained. However, owing to the shape and arrangement of the valve, as soon as the pressure is turned on, the valve is automatically closed.

In the modified construction shown in Fig. 4, the packing rings 6 are seated in spherical sockets 15, provided therefor. These sockets fit within the heads and are held therein by spring fingers 11, substantially the same as has been described for the packing rings. The body portion of the packing rings of this modification is curved to adjustably fit the sockets. This construction has the advantage of relieving the flange or spring portion to the packing rings of some of the strain thereon. The sockets 15 are formed of spring material and are provided with bearing lips 16 at their rear edges, which secure substantially the same result as the bearing lips 8 of the coupling members. The packing rings are held adjustably within the sockets by hooks 26, which engage over the rear edge of the sockets, as clearly appears from the drawing.

In the modified construction shown in Fig. 11, the packing rings 27 are covered with rubber, or like resilient material 28, which is provided with coupling lips 29. This construction secures the same result of the pressure of the steam holding the coupling lips in contact as in the structure described.

In the modified construction shown in Fig. 12, the packing rings 30 are made up of a plurality of U-shaped rings substantially the same as the packing ring 24 described for the swivel joint. The particular advantage shown in Figs. 3, 4 and 11 is that greater elasticity is secured. In this construction, the coupling members are preferably further supported by springs 31.

I have illustrated and described my improved coupling in detail in the form preferred by me on account of its structural simplicity and durability. I am aware, however, that it is capable of considerable variation in structural details without departing from my invention, and I desire to be understood as claiming the same specifically, as illustrated, as well as broadly.

Having thus described my invention, what I claim as new and desire to secure by Letters Patent is:

1. In a structure of the class described, the combination with the coupling heads, each having on one side a forwardly projecting rigid latch provided with a downturned engaging hook and on the other side a stop adapted to engage the latch of the opposite member; a projecting pin arranged at the bottom of the head adapted to engage the opposite member; a spring arranged in a chamber provided therefor adapted to hold said pin normally outward; each head having a spring metal packing ring having an inwardly projecting flange-like portion at its outer end provided with a bearing lip at its edge, the body portion of said ring having a transverse slit therein; a joint lap piece secured at one side of said slit and arranged to overlap the same; a swivel having an outwardly projecting flange at its inner end seated against a suitable shoulder in the head; an inwardly projecting annular flange in the head; and a packing ring formed of a plurality of united U-shaped spring metal rings having ring-like bearing lips on the outer arms thereof arranged to seat against the inner end of said swivel and the said flange in the head.

2. In a structure of the class described, the combination with the coupling heads, each having on one side a forwardly projecting rigid latch provided with a downturned engaging hook and on the other side a stop adapted to engage the latch of the opposite member; a projecting pin arranged at the bottom of the head adapted to engage the opposite member; a spring arranged in a chamber provided therefor adapted to hold said pin normally outward; each head having a spring metal packing ring having an inwardly projecting flange-like portion at its outer end provided with a bearing lip at its edge, the body portion of said ring having a transverse slit therein; a joint lap piece secured at one side of said slit and arranged to overlap the same; a swivel having an outwardly projecting flange at its inner end seated against a suitable shoulder in the head; an inwardly projecting annular flange in the head; and a U-shaped packing ring having ring-like bearing lips on the arms thereof arranged to seat against the inner end of said swivel and the said flange in the head.

3. In a structure of the class described, the combination with the coupling heads, each having on one side a forwardly projecting rigid latch provided with a downturned engaging hook and on the other side a stop adapted to engage the latch of the opposite member; a projecting pin arranged at the bottom of the head adapted to engage the opposite member; a spring arranged in a chamber provided therefor adapted to hold said pin normally outward; each head having a spring metal packing ring having an inwardly projecting flange-like portion at its outer end provided with a bearing lip at its edge, the body portion of said ring having a transverse slit therein; and a joint lap piece secured at one side of said slit and arranged to overlap the same.

4. In a structure of the class described, the combination with the coupling heads, each having on one side a forwardly projecting rigid latch provided with a downturned engaging hook and on the other side a stop adapted to engage the latch of the opposite member; each head having a spring metal packing ring having an inwardly projecting flange-like portion at its outer end provided with a bearing lip at its edge, the body portion of said ring having a transverse slit therein; a joint lap piece secured at one side of said slit and arranged to overlap the same; a swivel having an outwardly projecting flange at its inner end seated against a suitable shoulder in the head; an inwardly projecting annular flange in the head; and a packing ring formed of a plurality of united U-shaped spring metal rings having ring-like lips on the outer arms thereof arranged to seat against the inner end of said swivel and the said flange in the head.

5. In a structure of the class described, the combination with the coupling heads, each having on one side a forwardly projecting rigid latch provided with a downturned engaging hook and on the other side a stop adapted to engage the latch of the opposite member; each head having a spring metal packing ring having an inwardly projecting flange-like portion at its outer end provided with a bearing lip at its edge, the body portion of said ring having a transverse slit therein; a joint lap piece secured at one side of said slit and arranged to overlap the same; a swivel having an outwardly projecting flange at its inner end seated against a suitable shoulder in the head; an inwardly projecting annular flange in the head; and a U-shaped packing ring having ring-like bearing lips on the arms thereof arranged to seat against the inner end of said swivel and the said flange in the head.

6. In a structure of the class described, the combination with the coupling heads, each having on one side a forwardly projecting rigid latch provided with a downturned engaging hook and on the other side a stop adapted to engage the latch of the opposite member; each head having a spring metal packing ring having an inwardly projecting flange-like portion at its outer end provided with a bearing lip at its edge, the body portion of said ring having a transverse slit therein; and a joint lap piece secured at one side of said slit and arranged to overlap the same.

7. In a structure of the class described, the combination with the coupling heads, each head having a spring metal packing ring having an inwardly projecting flange-like portion at its outer end provided with a bearing lip at its edge, the body portion of said ring having a transverse slit therein; a joint lap piece secured at one side of said slit and arranged to overlap the same; a swivel having an outwardly projecting flange at its inner end seated against a suitable shoulder in the head; an inwardly projecting annular flange in the head; and a packing ring formed of a plurality of united U-shaped spring metal rings having ring-like bearing lips on the outer arms thereof arranged to seat against the inner end of said swivel and the said flange in the head.

8. In a structure of the class described, the combination with the coupling heads, each head having a spring metal packing ring having an inwardly projecting flange-like portion at its outer end provided with a bearing lip at its edge, the body portion of said ring having a transverse slit therein; a joint lap piece secured at one side of said slit and arranged to overlap the same; a swivel having an outwardly projecting flange at its inner end seated against a suitable shoulder in the head; an inwardly projecting annular flange in the head; and a U-shaped packing ring having ring-like bearing lips on the arms thereof arranged to seat against the inner end of said swivel and the said flange in the head.

9. In a structure of the class described, the combination with the coupling heads, each head having a spring metal packing ring having an inwardly projecting flange-like portion at its outer end provided with a bearing lip at its edge, the body portion of said ring having a transverse slit therein; and a joint lap piece secured at one side of said slit and arranged to overlap the same.

10. In a structure of the class described, the combination with the coupling heads, each head having a spring metal packing ring having an inwardly projecting flange-like portion at its outer end curved in cross section provided with a bearing lip at its edge, the body portion of said ring having a transverse slit therein; and a joint lap piece secured at one side of said slit and arranged to overlap the same.

11. In a structure of the class described, the combination with the coupling heads, each head having a spring metal packing ring having an inwardly projecting flange-like portion at its outer end provided with a ring-like bearing lip at its edge, the body portion of said ring having a transverse slit therein; and a joint lap piece secured at one side of said slit and arranged to overlap the same.

12. In a structure of the class described, the combination with the coupling heads, each head having a spring metal packing ring having an inwardly projecting flange-like portion at its outer end curved in cross section provided with a ring-like bearing lip at its edge, the body portion of said ring having a transverse slit therein; and a joint lap piece secured at one side of said slit and arranged to overlap the same.

13. In a structure of the class described, the combination with the coupling heads, each having on one side a forwardly projecting rigid latch provided with a downturned engaging hook and on the other side a stop adapted to engage the latch of the opposite member; a projecting pin arranged at the bottom of the head adapted to engage the opposite member; a spring arranged in a chamber provided therefor adapted to hold said pin normally outward; a packing member having an inwardly projecting flange-like resilient portion at its outer end provided with a bearing lip at its edge; a swivel having an outwardly projecting flange at its inner end seated against a suitable shoulder in the head; an inwardly projecting annular flange in the head; and a packing ring formed of a plurality of united U-shaped spring metal rings having ring-like bearing lips on the outer arms thereof arranged to seat against the inner end of said swivel and the said flange in the head.

14. In a structure of the class described, the combination with the coupling heads, each having on one side a forwardly projecting rigid latch provided with a downturned engaging hook and on the other side a stop adapted to engage the latch of the opposite member; a projecting pin arranged at the bottom of the head adapted to engage the opposite member; a spring arranged in a chamber provided therefor adapted to hold said pin normally outward; a packing member having an inwardly projecting flange-like resilient portion at its outer end provided with a bearing lip at its edge; a swivel having an outwardly projecting flange at its inner end seated against a suitable shoulder in the head; an inwardly projecting annular flange in the head; and a U-shaped packing ring having ring-like bearing lips on the arms thereof arranged to seat against the inner end of said swivel and the said flange in the head.

15. In a structure of the class described, the combination with the coupling heads, each having on one side a forwardly projecting rigid latch provided with a down-turned engaging hook and on the other side a stop adapted to engage the latch of the opposite member; a projecting pin arranged at the bottom of the head adapted to engage the opposite member; a spring arranged in a chamber provided therefor adapted to hold said pin normally outward; and a packing member having an inwardly projecting flange-like resilient portion at its outer end provided with a bearing lip at its edge.

16. In a structure of the class described, the combination with the coupling heads, each having on one side a forwardly projecting rigid latch provided with a down-turned engaging hook and on the other side a stop adapted to engage the latch of the opposite member; a packing member having an inwardly projecting flange-like resilient portion at its outer end provided with a bearing lip at its edge; a swivel having an outwardly projecting flange at its inner end seated against a suitable shoulder in the head; an inwardly projecting annular flange in the head; and a packing ring formed of a plurality of united U-shaped spring metal rings having ring-like bearing lips on the outer arms thereof arranged to seat against the inner end of said swivel and the said flange in the head.

17. In a structure of the class described, the combination with the coupling heads, each having on one side a forwardly projecting rigid latch provided with a down-turned engaging hook and on the other side a stop adapted to engage the latch of the opposite member; a packing member having an inwardly projecting flange-like resilient portion at its outer end provided with a bearing lip at its edge; a swivel having an outwardly projecting flange at its inner end seated against a suitable shoulder in the head; an inwardly projecting annular flange in the head; and a U-shaped packing ring having ring-like bearing lips on the arms thereof arranged to seat against the inner end of said swivel and the said flange in the head.

18. In a structure of the class described, the combination with the coupling heads, each having on one side a forwardly-projecting rigid latch provided with a down-turned engaging hook and on the other side a stop adapted to engage the latch of the opposite member, the said hooks and stops of said heads being arranged to be engaged or disengaged by the transverse rocking movement of said heads, and a packing member having an inwardly-projecting flange-like resilient portion at its outer end.

19. In a structure of the class described, the combination with the coupling heads, each having a packing member having an inwardly projecting flange-like resilient portion at its outer end provided with a bearing lip at its edge; a swivel having an outwardly projecting flange at its inner end seated against a suitable shoulder in the head; an inwardly projecting flange in the head; and a packing ring formed of a plurality of united U-shaped spring metal rings having ring-like bearing lips on the outer arms thereof arranged to seat against the inner end of said swivel and the said flange in the head.

20. In a structure of the class described, the combination with the coupling heads, each having a packing member having an inwardly projecting flange-like resilient portion at its outer end provided with a bearing lip at its edge; a swivel having an outwardly projecting flange at its inner end seated against a suitable shoulder in the head; an inwardly projecting annular flange in the head; and a U-shaped packing ring having ring-like bearing lips on the arms thereof arranged to seat against the inner end of said swivel and the said flange in the head.

21. In a structure of the class described, the combination with a head, of a swivel having an outwardly projecting flange at its inner end seated against a suitable shoulder in the head; a collar threaded into the head for retaining said swivel therein; an inwardly projecting annular flange in the head; and a packing ring formed of a plurality of united U-shaped spring metal rings having ring-like bearing lips on the outer arms thereof arranged to seat against the inner end of said swivel and the said flange in the head.

22. In a structure of the class described, the combination with a head, of a swivel having an outwardly projecting flange at its inner end seated against a suitable shoulder in the head; a collar threaded into the head for retaining said swivel therein; an inwardly projecting annular flange in the head; and a U-shaped spring metal packing ring having ring-like bearing lips on the arms thereof arranged to seat against the inner end of said swivel and the said flange in the head.

23. In a structure of the class described, the combination with a head, of a swivel having an outwardly projecting flange at its inner end seated against a suitable shoulder in the head; an inwardly projecting annular flange in the head; and a packing ring formed of a plurality of united U-shaped spring metal rings having ring-like bearing lips on the outer arms thereof arranged to seat against the inner end of said swivel and the said flange in the head.

24. In a structure of the class described, the combination with a head, of a swivel having an outwardly projecting flange at its inner end seated against a suitable shoulder in the head; an inwardly projecting annular flange in the head; and a U-shaped spring metal packing ring having ring-like bearing lips on the arms thereof arranged to seat against the inner end of said swivel and the said flange in the head.

25. In a structure of the class described, the combination with a head; a spring metal packing ring having an inwardly-projecting flange-like portion at its outer end curved in cross section and provided with a ring-like bearing lip at its edge, the body of said ring having a transverse slit therein; and a joint lap-piece secured at one side of the said slit and arranged to overlap the same.

26. In a structure of the class described, the combination with a head; a spring metal packing ring having an inwardly-projecting flange-like portion at its outer end and provided with a ring-like bearing lip at its edge, the body of said ring having a transverse slit therein; and a joint lap-piece secured at one side of the said slit and arranged to overlap the same.

27. In a structure of the class described, the combination with a head; a spring metal packing ring having an inwardly-projecting flange-like portion at its outer end curved in cross section, the body of said ring having a transverse slit therein; and a joint lap piece secured at one side of said slit and arranged to overlap the same.

28. In a structure of the class described, the combination with a head; a spring metal packing ring having an inwardly-projecting flange-like portion at its outer end, the body of said ring having a transverse slit therein; and a joint lap-piece secured at one side of said slit and arranged to overlap the same.

29. In a structure of the class described, the combination of a coupling head having a cylinder-like bore; and a sleeve-like packing ring sleeved into said coupling head, said packing ring having an inwardly-projecting flange at its outer end, said flange being provided with a ring-like bearing lip at its edge.

30. In a structure of the class described, the combination of a coupling head having a cylinder-like bore; and a sleeve-like packing ring sleeved into said coupling head, said packing ring having an inwardly-projecting flange at its outer end.

In witness whereof, I have hereunto set my hand and seal in the presence of two witnesses.

JOHN HENRY PHILLIPS, Jr. [L. S.]

Witnesses:
W. A. CUNNINGHAM,
F. A. PALMER.